W. WELLINGTON.
Check-Hook.

No. 221,007.                    Patented Oct. 28, 1879.

Witnesses:

Inventor:

UNITED STATES PATENT OFFICE.

WILLIAM WELLINGTON, OF ROCKFORD, ILLINOIS.

IMPROVEMENT IN CHECK-HOOKS.

Specification forming part of Letters Patent No. 221,007, dated October 28, 1879; application filed March 18, 1879.

*To all whom it may concern:*

Be it known that I, WILLIAM WELLINGTON, of Rockford, in the county of Winnebago and State of Illinois, have invented a new and useful Improvement in Check-Hooks; and I do hereby declare that the following is a full and exact description of the same, reference being had to the accompanying drawings, and to the letters of reference marked thereon.

Figure 1:
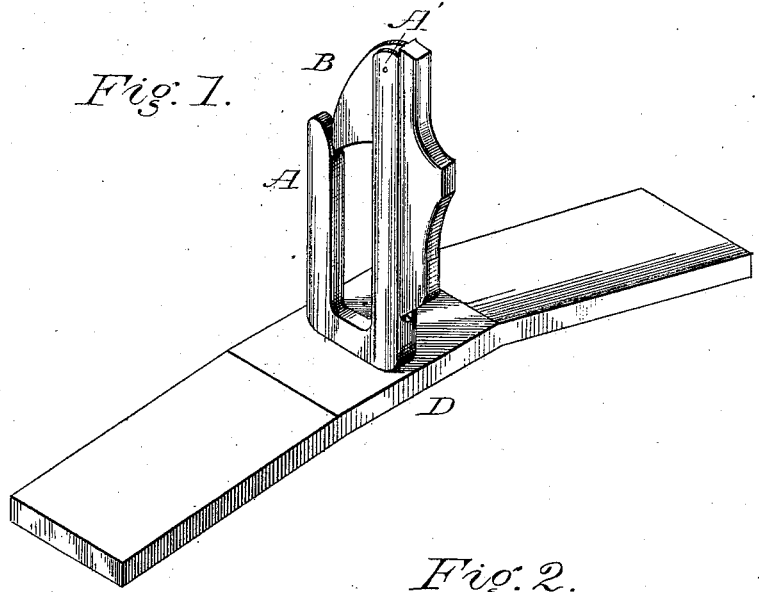
Figure 2:
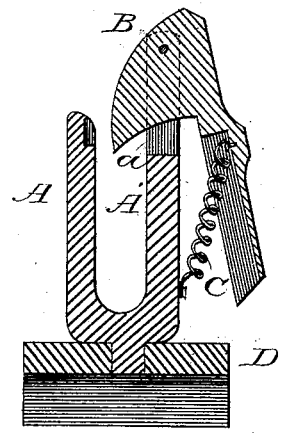

In the drawings forming a part of this specification, Figure 1 is a perspective view, and Fig. 2 is a vertical section, of my invention.

The object of the invention is to provide a simple check-hook to be secured to the ordinary harness, and so arranged that the check when in place cannot be accidentally unhooked, yet can be readily removed by the hand of the operator when desired; and it consists of a forked iron made fast to the back-pad of the harness at its lower end, the forked ends rising vertically above the harness, with one short post, over which the check-rein is hooked and placed forward of a longer post, which rises sufficiently far above the forward leg or rein-hook to allow a slot being made in the same, and within which is pivoted a spring-latch that closes the opening through which the rein enters, all of which will be hereinafter described.

In the drawings, A represents the short post, over which the check-rein is hooked; A', the longer post, and *a* the slot in the same. B is a latch pivoted within the slot *a*, made hook-shaped, so as to extend from its pivoted point across the opening made for the rein, and thus inclosing the same when in working position. This latch B has a grooved extension, which serves as a lever for operating the same, and within the said groove is placed a spiral spring, C, having one of its ends secured to the latch arm or lever, the other end being secured to the part A' in such manner that as the latch-lever is swung back to insert the check-rein or to remove the same, the spring automatically draws the lever back to its normal position and closes the opening.

D represents the back-pad of the harness, to which the check-hook is secured in any well-known manner. If desired, this hook may be circular in form, so as to accommodate a high or low head horse, and always have a central draft. It can also have the part A' grooved similar to the lever portion of the latch, so that a portion of the retaining-spring will lie within the said groove.

The latch-lever may also, if desired, have a rear extension, which will serve as a thumb-piece or handle for more conveniently operating the latch.

It will be observed that by the use of this device the horse can be quickly checked or unchecked without uncovering the hand of the operator should he be wearing gloves or mittens, and it also prevents a restless horse from unchecking himself, as the operating-spring always keeps the opening closed.

It will be further observed that in checking the horse it is not necessary for the operator to raise the check-lever by hand, as by pressing the rein upon the inclined portion of the hook it readily opens and allows the said rein to enter without further manipulation, all of which will be readily understood without further description.

Having now described my invention, what I claim as new, and desire to secure by Letters Patent, is—

In a check-hook, the combination of the rear vertical, or nearly vertical, part, A', the front vertical, or nearly vertical, part, A, and the spring C, for securing in a closed position the locking-latch, having the grooved operating or hand lever inclosing the spring, substantially as described.

This specification signed and witnessed this 10th day of March, 1879.

WILLIAM WELLINGTON.

Witnesses:
 G. W. FORD,
 E. A. FORD.